(12) United States Patent
Ström et al.

(10) Patent No.: US 8,471,851 B2
(45) Date of Patent: Jun. 25, 2013

(54) METHOD AND DEVICE FOR RENDING THREE-DIMENSIONAL GRAPHICS

(75) Inventors: Jacob Ström, Stockholm (SE); Tomas Akenine-Möller, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1010 days.

(21) Appl. No.: 11/719,747

(22) PCT Filed: Nov. 18, 2005

(86) PCT No.: PCT/EP2005/012377
§ 371 (c)(1),
(2), (4) Date: Feb. 5, 2009

(87) PCT Pub. No.: WO2006/053765
PCT Pub. Date: May 26, 2006

(65) Prior Publication Data
US 2009/0135193 A1    May 28, 2009

Related U.S. Application Data

(60) Provisional application No. 60/631,059, filed on Nov. 24, 2004.

(30) Foreign Application Priority Data

Nov. 19, 2004    (EP) ..................................... 04027592

(51) Int. Cl.
*G09G 5/36*    (2006.01)

(52) U.S. Cl.
USPC ........... 345/422; 345/204; 345/214; 345/545; 345/660

(58) Field of Classification Search
USPC ................. 345/421, 422, 426, 204, 214, 545, 345/660
See application file for complete search history.

(56) References Cited

U.S. PATENT DOCUMENTS

| | | | | |
|---|---|---|---|---|
| 5,237,650 A | * | 8/1993 | Priem et al. | 345/443 |
| 5,856,829 A | * | 1/1999 | Gray et al. | 345/422 |
| 6,037,946 A | * | 3/2000 | Takeda | 345/422 |
| 2005/0219252 A1 | * | 10/2005 | Buxton et al. | 345/542 |

* cited by examiner

*Primary Examiner* — Xiao M. Wu
*Assistant Examiner* — Todd Buttram
(74) *Attorney, Agent, or Firm* — Potomac Patent Group PLLC

(57) ABSTRACT

A method for updating values of a depth buffer comprising values for display blocks of a display, and a device for implementing the method. The display is partitioned into a plurality of display regions, including a plurality of display blocks and having a minimum region depth value and a maximum region depth value. Each display region includes a plurality of display subregions. A minimum subregion depth value and a maximum subregion depth value are determined relative to at least one of the minimum region depth value and the maximum region depth value.

40 Claims, 6 Drawing Sheets

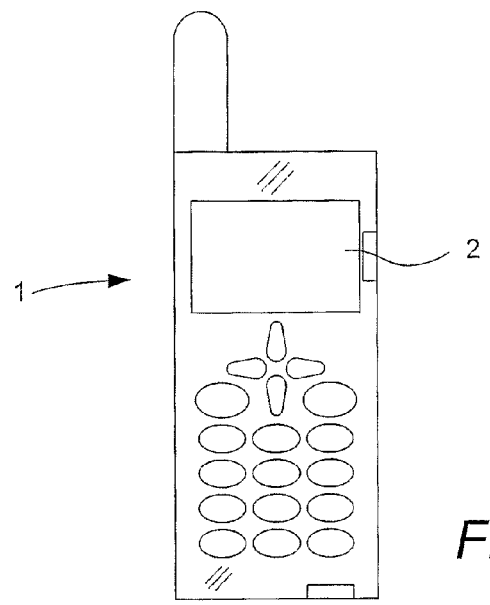
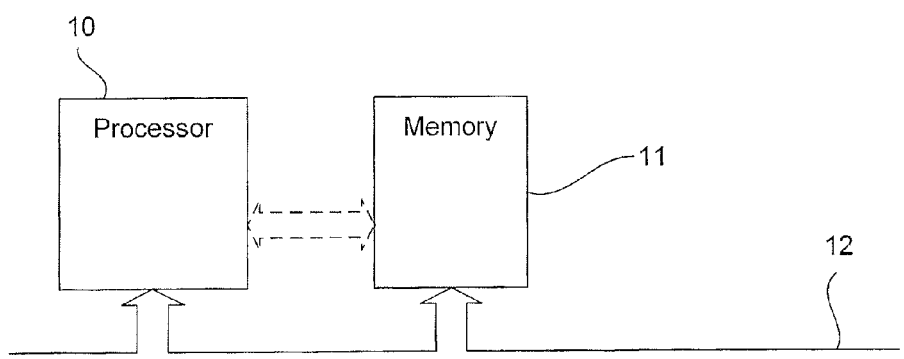
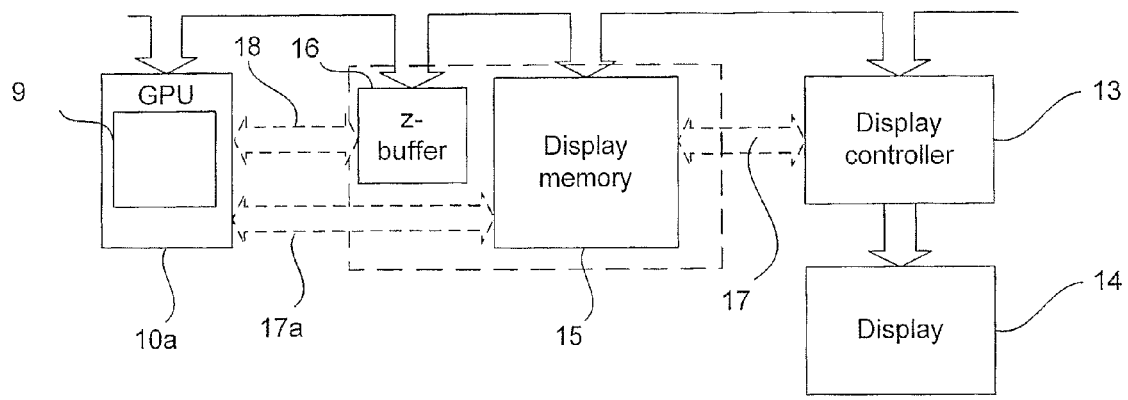
Fig 1
Fig 2

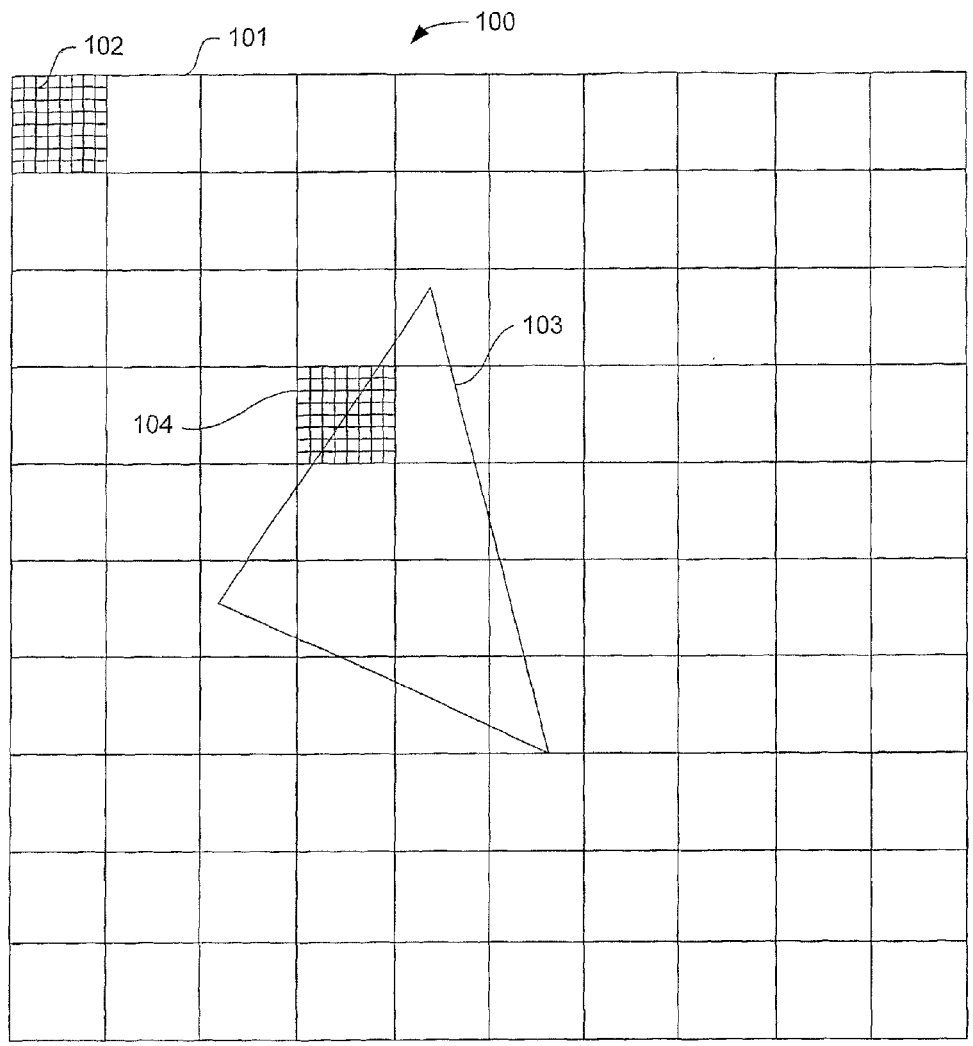
Fig 3
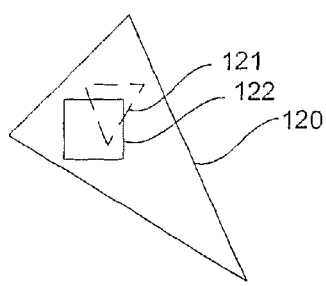
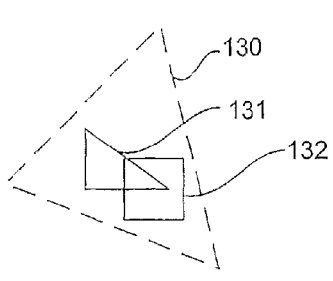
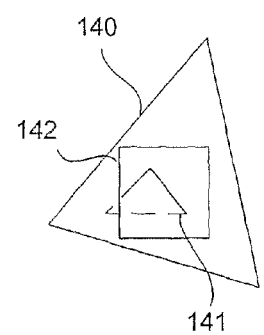
Fig 4a  Fig 4b  Fig 4c

METHOD AND DEVICE FOR RENDING THREE-DIMENSIONAL GRAPHICS

CROSS-REFERENCE TO RELATED APPLICATIONS

This application claims the benefit of U.S. Provisional Application No. 60/631,059, filed Nov. 24, 2004, which is hereby incorporated herein by reference in its entirety. This application also claims priority under 35 U.S.C. §119 to European Patent Application No. 04027592.7, filed Nov. 19, 2004, which is hereby incorporated herein by reference in its entirety.

TECHNICAL FIELD OF THE INVENTION

The present invention relates to a method for updating a depth buffer comprising depth values for rendering three-dimensional graphics. The invention also relates to a device for implementing the method.

DESCRIPTION OF RELATED ART

Real-time rendering of three-dimensional graphics has a number of appealing applications on a portable electronic apparatus, such as a mobile terminal. Such applications include, e.g., games man-machine interfaces, messaging, and m-commerce. Since three-dimensional rendering is a computationally intensive task, dedicated hardware is often used to reach sufficient performance.

During three-dimensional rendering, a depth buffer may be used to resolve visibility, because geometric primitives, such as polygons or triangles, can be drawn in any order. The depth buffer stores a distance from the eye to the object. If a new object to be rendered is farther away than the contents of the depth buffer, it is hidden by already drawn content and should not be displayed, and the depth buffer should not be overwritten.

However, such a graphics system is not optimal, as a pixel can be overdrawn several times. Even if a pixel is overdrawn several times, only one geometric primitive (polygon) will be visible at the end.

One way to decrease depth buffer accesses is to use occlusion culling. The screen is divided into display regions comprising e.g. 8×8 display blocks. For each display region the maximum depth value or z-value, zmax, for the display region is stored in a memory, such as an on-chip memory or a cache memory, which is fast and energy-efficient. When a new polygon is to be rendered inside said region, the minimum z-value, zmin, of the part of the polygon inside that display region is computed or estimated. If zmin is larger than zmax of the display region, the polygon that is to be rendered is completely occluded for that display region, and that display region need not be processed any further. If the polygon is not occluded, the pixels inside the display region are processed one by one to decide whether the depth buffer should be overwritten with the values of the polygon.

It is also possible to store both zmin and zmax for a display region in the memory. Initially, zmin and zmax are set to initial values, zmin=FAR and zmax=NEAR. When a new polygon is to be rendered in a display region, zmin and zmax are calculated or estimated for that part of the polygon, which is to be rendered in the display block. If zmin for the polygon is larger than zmax for the display region, the part of the polygon that is inside that display region will definitely not be rendered, and the depth buffer need not be updated. If zmax for the polygon is smaller than zmin for the display region, the depth buffer can simply be overwritten without first being read. If the range defined by zmin and zmax for the polygon overlaps with the range defined by zmin and zmax for the display region, then each z-value for the polygon is computed and compared to the corresponding z-value stored in the depth buffer. Thus, it may be decided whether the depth buffer should be overwritten with the z-value for the polygon for that pixel.

The effectiveness of the culling is dependent on the size of the display regions. With smaller display regions the culling can be made more accurate. However, the smaller display regions, the more memory resources are required.

In a portable electronic apparatus, the bandwidth usage to main memory should be reduced as much as possible, because such memory accesses consume a significant portion of the energy, which is a scarce resource in a portable electronic apparatus.

SUMMARY OF THE INVENTION

It is an object of the invention to provide a method and a device, which decrease the bandwidth requirements for memory reads.

In a first aspect, the invention provides a method for reading values from and/or writing values to a depth buffer comprising depth values for display blocks of a display, whereby the display is partitioned into a plurality of display regions including a plurality of display subregions each including a plurality of said display blocks. The method comprises: determining a minimum region depth value and a maximum region depth value for the display blocks of at least one display region; and determining a minimum subregion depth value and a maximum subregion depth value for the display blocks of at least one display subregion.

In an embodiment, the minimum subregion depth value is determined relative to the minimum region depth value and the maximum subregion depth value is determined relative to the maximum region depth value.

In another embodiment, the minimum subregion depth value is determined relative to the minimum and maximum region depth value and the maximum subregion depth value is determined relative to the maximum and minimum region depth value.

The minimum subregion depth value may be determined such that it is larger than or equal to the minimum region depth value and the maximum subregion depth value such that it is smaller than or equal to the maximum region depth value. Moreover, the minimum subregion depth value may be determined such that it is smaller than or equal to all stored depth values for said subregion and the maximum subregion depth value such that it is larger than or equal to all stored depth values for said subregion. In addition, the minimum region depth value may be determined such that it is smaller than or equal to all stored depth values for said region and the maximum region depth value such that it is larger than or equal to all stored depth values for said region According to another embodiment, at least one of a minimum depth value and a maximum depth value of a geometric primitive to be rendered in a specific display subregion is determined; and at least one of the minimum depth value and the maximum depth value is compared with at least one of the minimum subregion depth value and the maximum subregion depth value for determining whether the depth buffer needs to be read for said display subregion. Moreover, at least one of a minimum depth value and a maximum depth value of a geometric primitive to be rendered may be determined in a specific display region; and at least one of the minimum depth value and the maximum depth value is compared with at least one of the minimum region depth value and the maximum region depth value for determining whether the depth buffer needs to be read for said display region.

At least one geometric primitive depth value may be determined for at least one display block of said subregion. The depth value of said at least one display block may be compared with at least one of the minimum subregion depth value and the maximum subregion depth value to determine whether the depth buffer needs to be read for said display block. The geometric primitive depth value of said at least one display block may be compared with at least one of the minimum region depth value and the maximum region depth value to determine whether the depth buffer needs to be read for said display block.

In an alternative embodiment, the minimum subregion depth value, $zmin^{sub}$, may be determined relative to the minimum region depth value, $zmin^r$, and the maximum region depth value, $zmax^r$, according to the equation:

$$zmin^{sub} = zmin^r + (zmax^r - zmin^r)*k/(2^m - 1)$$

where k is in $[0, 1, 2, \ldots, 2^n-1]$, and the value of the maximum subregion depth value, $zmax^{sub}$, may be determined relative to the minimum region depth value, $zmin^r$, and the maximum region depth value, $zmax^r$, according to the equation:

$$zmax^{sub} = zmax^r + (zmin^r - zmax^r)*s/(2^n - 1)$$

where s is in $[0, 1, 2, \ldots, 2^n-1]$, n being the number of bits used for encoding $zmax^{sub}$ and m being the number of bits used for encoding $zmin^{sub}$ relative to the minimum region depth value and the maximum region depth value.

Alternatively, the value of the minimum subregion depth value, $zmin^{sub}$, may be determined relative to the minimum region depth value, $zmin^r$, and the maximum region depth value, $zmax^r$, according to the equation:

$$zmin^{sub} = zmin\ r + (zmax^r - zmin^r)*k/2^m$$

where k is in $[0, 1, 2, \ldots, 2^n-1]$, and the value of the maximum subregion depth value, $zmax^{sub}$, may be determined relative to the minimum region depth value, $zmin^r$, and the maximum region depth value, $zmax^r$, according to the equation:

$$zmax^{sub} = zmax^r + (zmin^r - zmax^r)*s/2^n$$

where s is in $[0, 1, 2, \ldots, 2^n-1]$, wherein m is the number of bits used for encoding the minimum subregion depth value and n is the number of bits used for encoding the maximum subregion depth value relative to the minimum region depth value and the maximum region depth value.

In still another embodiment, the method comprises first determining the minimum subregion depth value relative to the minimum region depth value and the maximum region depth value, and then determining the maximum subregion depth value relative to the minimum subregion depth value and the maximum region depth value. Alternatively, the method comprises first determining the maximum subregion depth value relative to the minimum region depth value and the maximum region depth value, and then determining the minimum subregion depth value relative to the maximum subregion depth value and the minimum region depth value.

In another aspect, there is provided a processing device for performing the methods indicated above. The device is further defined in the appended patent claims.

In a further aspect, there is provided an electronic apparatus comprising a processing device as defined above. The apparatus may be a mobile radio terminal, a pager, a communicator, an electronic organizer, a smartphone, a personal digital assistant, a handheld device or a computer. The apparatus may be a mobile telephone. In a still further aspect, there is provided a computer program product comprising computer program code means to execute the method as mentioned above when the computer program code means is run by an electronic device having computer capabilities. The computer program product may be embodied on a computer readable medium.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of the invention will appear from the following detailed description of the invention, reference being made to the accompanying drawings, in which:

FIG. 1 is a front view of an electronic apparatus comprising a display;

FIG. 2 is a block diagram of a system for generating, storing and comparing depth values;

FIG. 3 is schematic illustration of an array of display regions comprising display blocks;

FIGS. 4a-4c are schematic illustrations showing rendered objects and objects to be rendered;

DETAILED DESCRIPTION OF EMBODIMENTS

Figure 5:
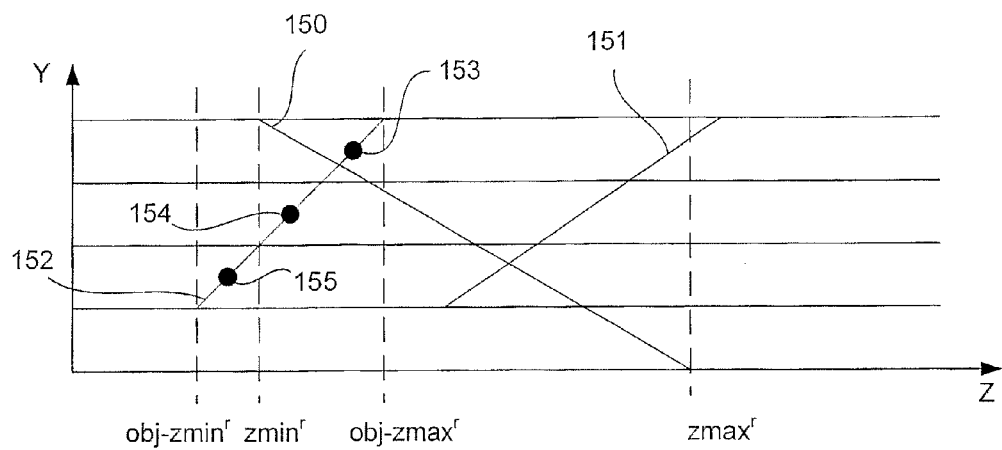
FIG. 5 is a diagram of a display region and the relationship between depth values for display blocks.

FIG. 1 illustrates an electronic apparatus in which the device and method according to the invention may be implemented. The electronic apparatus is in this example embodied as, but not limited to, a mobile telephone 1.

According to embodiments of the invention, z-values or depth values for geometric primitives are tested against at least one of a minimum depth value, zmin, and a maximum depth value, zmax, which are associated with a specific display region. An object may be built up of one or several geometric primitives, such as polygons or, more specifically, triangles. Below, the terms "object", "geometric primitives" and "polygones" are used to describe something that should be rendered. Geometric primitives that have already been rendered are called "content".

According to an embodiment of the invention, estimated or calculated minimum, $obj-zmin^r$, and, maximum, $obj-zmax^r$, z-values of a geometric primitive or polygon to be rendered inside a display region are tested against at least one of $zmin^r$ and $zmax^r$ for the display region. If it may be definitely determined that all the display blocks of the polygon to be rendered will be visible when rendered, a depth buffer need not be read during the rendering of the polygon, only written to. If it may be definitely determined that the polygon will be occluded, the depth buffer need not be read or written to during the rendering. Finally, if it may be determined that the polygon to be rendered may be at least partly visible when rendered, then a depth value, obj-z-value, of the polygon is calculated for each display block. These calculated depth values per display block could in turn be compared with stored values of the display block. If it can be determined from this comparison that the polygon display block is visible during rendering, the depth value can be directly written to the depth buffer and no read of the values stored in the depth buffer is needed for that display block. If it can be determined that the polygon display block is occluded, no write of values stored in the depth buffer is needed either.

According to another embodiment of the invention, each display region is partitioned into display subregions. A minimum subregion depth value, $zmin^{sub}$, and a maximum subregion depth value, $zmax^{sub}$, for each display subregion are known to lie in the range of $zmin^r$ and $zmax^r$ for the complete display region. Therefore, according to the invention, the minimum and maximum depth values for each display subregion may be described relative to the minimum- and maximum depth value of the display region, which means that even further readings of the depth buffer may be avoided, as will be described below. However, the relative values need to be read.

The memory bandwidth requirements for implementing the invention is lower compared to conventional occlusion culling. As memory accesses are relatively power consuming, the present invention is useful in portable electronic devices, in which memory and battery capacity is limited, such as in a handheld device, a mobile radio terminal, a pager, a communicator, an electronic organizer, a smartphone, a cellular phone or a personal digital assistant. However, the invention may also be implemented in a stationary electronic device, such as a computer.

The mobile telephone 1 shown in FIG. 1 comprises a man-machine interface for interaction between a user and the mobile telephone 1. The man-machine interface comprises, but is not limited to, a display 2, such as an LCD display or a touch screen, on which graphics, such as still images, continuous streams of images, icons, text, etc., may be displayed. To render three-dimensional objects, such as polygons, the objects are tested for occlusion during rendering to determine whether the depth buffer at all needs to be accessed, as will be explained below.

FIG. 2 is a block diagram of an embodiment of a system for determining, comparing and storing z-values. A processor 10, such as a CPU (Central Processing Unit), a DSP (Digital Signal Processor), an ASIC (Application Specific Integrated Circuit), a FPGA (Field-Programmable Gate Array), hard-wired logic etc., is connected to a memory 11 by means of a data bus 12. The processor may be responsible for the overall control of the mobile telephone 1.

A processing device 10a, such as a GPU, may be provided as a stand-alone processor or be provided by software implemented in the processor 10 and be configured to generate z-values and various maximum and minimum depth values as will be explained below. The GPU may also be arranged for producing color data for the objects. The memory 11 may comprise computer readable instructions or code means, such as code portions of an application program, which is run by the system. The application program may be a computer game or a CAD (Computer Aided Design) program.

The processor 10 retrieves instructions from the memory 11, and executes them in order to perform specific tasks. A task for the processor 10 may be to provide a display controller 13 with information regarding content or graphics to be drawn on a display 14. The display controller 13 may be provided as a separate hardware component, such as a processor, a DSP, an ASIC, a FPGA, hard-wired logic etc. Alternatively, the display controller 13 is implemented with a combination of software and hardware, or it may be provided in software and executed by the processor 10. The display controller 13 is connected to the data bus 12. Alternatively, or in addition, the display processor 13 is connected to processor 10 by means of a separate data bus (not shown) The data bus may be a high-speed data bus, in case a large amount of information is to be transferred between the processor 10 and the display controller 13. In this case, the data transfer on the separate data bus will not interfere with the data traffic on the ordinary data bus 12.

A display memory 15 is connected to the data bus 12 and stores information sent from the processor 10 regarding the content that shall be drawn on the display 14. The display memory 15 comprises e.g. a sample buffer for storing information, such as sample values of the rendered content, and a color buffer. The color buffer holds the pixel values generated, such as colors of the pixels to be displayed on the display 14 after the rendering of a previous image is completed. As with the interconnection between processor 10 and the display controller 13, the display memory 15 may be connected directly to the display controller 13 by means of a separate, high-speed bus 17, shown in phantom lines. The display memory 15 may also form part of the memory 11. Since the display controller 13 and the display memory 15 normally are used for producing a continuous stream of images, it may be an advantage if the link between these two units is as fast as possible and does not block the normal traffic on the data bus 12. The display memory may be connected by a separate high-speed bus 17a to the processing device 10a.

The display controller 13 may comprise a VDAC (Video Digital to Analog Converter), which reads the information from the display memory 15 and converts it to an analog signal, e.g. a RGB (Red, Green, Blue) composite signal that is provided to the display 14 in order to draw the individual pixels thereon.

The color buffer or frame buffer stored in the display memory 15 may store pixel information corresponding to a graphical image. The pixel information may be represented by a grid-like array of pixels where each pixel is assigned a color. The values in the color buffer may be represented as R, G, and B values corresponding to red color, green color, and blue color of the pixel making up a graphical image. The number of bits defining the R, G, and B values depends on the number of colors and shades to be represented. Further bits may be defined.

In processing the three-dimensional graphic object to be displayed, the depth attribute, or z-values at the sample positions inside the polygon, of the object must be considered prior to updating any value in the color buffer. If the new object being processed is located at least partly behind and at least partly obscured by a displayed content, only a visible portion of the new object should be drawn to the color and depth buffer. On the other hand, if the new object is completely obscured by already drawn content, there is no need to update the color buffer at all and the object is not drawn or rendered.

Three-dimensional objects may be represented by a set of vertices defining polygon surfaces. Each vertex is defined by x, y and z dimensions corresponding to the X, Y and Z axes. The X and Y axes define a view plane and the Z axis represents a scaled distance from the view plane to a viewer's origin. The z coordinate value indicates the depth of an object at a pixel location defined by specific x and y coordinates.

A depth buffer 16 for storing depth values is connected to the bus 12. The depth buffer 16 may by provided as a stand-alone memory unit directly connected to the bus 12 or be an integral part of memory 15. The depth buffer 16 provides a storage means, in which z-values or depth values of each pixel may be stored. When a new object should be drawn in a displayed portion of a view plane, a determination has to be made as to whether the new object will be visible and should be displayed, or whether the new object is hidden by content already displayed. As the z-values are stored in a depth buffer that may be located off-chip, a high-speed bus 18 (shown in phantom lines) may be provided between processing device 10$a$ and the depth buffer 16, whereupon access to the depth buffer 16 does not interfere with other traffic on the bus 12.

Processing device 10$a$ may comprise an integrated storage means 19, such as an on-chip memory or a cache memory. The processing device 10$a$ and the storage means 19 may be provided on the same chip, thus not occupying any memory bandwidth of the bus 12. The storage means 19 may store minimum region depth values and maximum regions depth values associated with each display region 101 (FIG. 3) of the display. Also, the storage means may store minimum subregion depth values and maximum subregion depth values for display subregions. If the processing device 10$a$ is a GPU, the storage means 19 may be an on-chip memory. If the processing device 10$a$ is a CPU, the storage means 19 may be either a cache memory or an on-chip memory.

FIG. 3 illustrates a display 100 partitioned into a plurality of display regions 101. In this embodiment, the display 100 comprises 10×10 display regions. However, the display may according to other embodiments be partitioned into any number of display regions 101, even a single one. Each display region is partitioned into a plurality of display blocks 102. Each display block may comprise one pixel. In this embodiment, each display region 101 comprises 8×8 display blocks. Alternative dimensions may e.g. be 4×4, 8×4, 16×4, 16×8 or 16×16. These dimensions are only examples and other embodiments could comprise any number of display blocks 102 within each display region 101. If a display region with 8×8 display blocks are used, a screen with a resolution of 1024×768 pixels would comprise 123×96 display regions.

The minimum region depth value for a display region 101 represents a minimum of all the depth values of display blocks within said display region 101. Correspondingly, the maximum region display value represents a maximum of all the depth values of display blocks 102 within said display region 101.

In FIG. 3, a portion of a new triangle 103 is to be rendered in a specific display region 104. Before the color and depth buffers are updated according to the potential influence of triangle 103, it has to be tested whether the triangle 103 will be obscured by primitives already rendered into the display region 104.

FIGS. 4$a$-4$c$ illustrate various situations that could happen when an object, such as a triangle is rendered into a display region 104. That part of a triangle that is located further away than at least a portion of another triangle is drawn with a dashed line.

In FIG. 4$a$, a first triangle 120 is displayed in a specific display region 122. A second triangle 121 is then rendered in said specific display region 122. The minimum region depth value, zmin$^r$, is the same as the minimum polygon depth value for the first triangle in that display region, and the maximum region depth value, zmax$^r$, is the same as the maximum polygon depth value for the first triangle in that display region. Assume the second triangle 121 is entirely located further away than the first triangle 120. Consequently, zmin of the second triangle 121 is larger than zmax of the first triangle 120 and consequently larger than zmax$^r$. The first triangle 120 is the object, which is located closest to a viewer in said display region. By comparing zmin of the second triangle 121 with zmax$^r$ of the display region it may be ascertained that the second triangle should definitely not overwrite any buffer values (e.g. z and color) for said specific display region 122.

In FIG. 4$b$, a first triangle 130 is displayed in a specific display region 132. A second triangle 131 is then rendered in said specific display region 132. The minimum region depth value, zmin$^r$, is the same as zmin for the first triangle, and the maximum region depth value, zmax$^r$, is the same as zmax for the first triangle in the display region 132. The second triangle 131 is located closer to the viewer than the first triangle 130. Consequently, zmax of the second triangle 131 is smaller than zmin of the first triangle 130 and than zmin$^r$. Thus, by comparing zmax of the second triangle 131 with zmin$^r$ of the display region it may be ascertained that the second triangle should definitely be rendered, and memory reads to the depth buffer can be completely avoided for said display region 132, but the z-values of the polygon can be directly written to the depth buffer. Also, the storage means 19 should be updated, if needed, with new values of zmin$^r$ and zmax$^r$ corresponding to zmin and/or zmax of the second triangle 131.

In FIG. 4$c$, a first triangle 140 is displayed in a specific display region 142. The minimum region depth value, zmin$^r$ is the same as zmin for the first triangle 140, and the maximum region depth value, zmax$^r$, is the same as zmax for the first triangle 140. A second triangle 141 is rendered in said specific display region 142. The second triangle 141 is only partly located further away than the first triangle 140 in a way so that at least a portion of the first triangle 141 (marked with a solid line) is closer than the first triangle 140, and at least one other portion of the second triangle 141 (marked with a dashed line) is farther away than the first triangle 140. Consequently, zmin of the second triangle 141 is smaller than the zmax$^r$ of the display region 142, and/or zmax of the second triangle 141 is larger than zmax$^r$ of the display region. Thus, only by comparing zmin and zmax of the second triangle 141 with zmin$^r$ and/or zmax$^r$ of the display region 142, it may not be ascertained that the second triangle 141 should definitely be rendered or definitely not be rendered, and further processing is required, wherein it will be necessary to read the depth buffer 16.

The values of zmin and zmax for the new triangles 121, 131, 141 may be calculated or estimated. Zmin and zmax may e.g. be determined as the zmin and zmax values of the vertices of the polygon. Alternatively, if the graphics primitive is a polygon, they can be estimated by evaluating the plane equation of the polygon at the corners of the display region, and then take the min and max of these values. Moreover, a combination of these techniques may be used. According to another embodiment, zmin and zmax for a new triangle are estimated by knowing the size of the display region and the slope of a border of the triangle within said display region. The values of zmin and zmax should be estimated conservatively.

It should be noted that the situations described in FIGS. 4$a$-4$c$ are only given for explanation purpose. Other situations may also occur, for example when the triangles are not overlapping. Also, other numbers of triangles within a display region are possible. Furthermore, each display block of a display region may relate to a different triangle.

When a definite answer with respect to the visibility of the new object cannot be given by region-wise comparing zmin and zmax of the new object with $zmin^r$ and $zmax^r$ of the display region, a similar comparison is made subregion-wise. If still no definite answer can be given, all z-values for the object within a specific display region may be generated. The z-value for each display block of the new triangle may be generated by perspective-correct interpolation of the z-values of the vertices.

Each z-value may be compared with at least one of $zmin^{sub}$ and $zmax^{sub}$ for the subdisplay region, i.e. it is not necessary to compare the z-values with both $zmin^{sub}$ and $zmax^{sub}$. Thus, it may be definitely determined, display block per display block, whether the depth buffer needs to be read or not for each z-value.

If the z-value of the polygon corresponding to a specific display block is smaller than $zmin^r$ for the display region, the depth buffer 16 does not need to be read, but it definitely needs to be written in order to update the depth buffer with the z-value corresponding to the specific display block for the new object. The depth buffer 16 can be updated without any further processing for that display block.

If the z-value of the polygon corresponding to the specific display block is larger than $zmax^r$ for the display region, the depth buffer 16 does definitely not need to be neither read from, nor written to, for that display block.

However, if the z-value of the polygon corresponding to the specific display block is between $zmin^r$ and $zmax^r$ for the display region, no definite answer can be given. Then, the depth buffer 16 needs to be read in order to retrieve a stored z-value associated with the specific display block. The generated z-value for the specific display block is compared to the corresponding stored, and now retrieved, z-value. If the generated z-value is smaller than the corresponding stored z-value, the depth buffer is updated with the generated z-value. If the generated z-value is larger than the corresponding stored z-value, the depth buffer does not need to be updated.

It should be noted that other comparison operators may be used according to other embodiments, such as less or equal than, larger than, equal to, larger or equal to the corresponding stored z-value.

It is an advantage to compare not only zmin and zmax for the object but also each interpolated z-value for an object to $zmin^{sub}$ and $zmax^{sub}$ for a subdisplay region, as reads to the depth buffer 16 may be avoided. Thus the utilized memory bandwidth may be even more decreased compared to only comparing zmin and zmax for the object.

FIG. 5 illustrates a display region in cross-section, wherein display blocks are illustrated in the Y-axis and the relationship between depth values is indicated along the Z-axis. For illustrative purposes, the number of display blocks of one column of a display region is only four.

A first and a second object 150, 151 have been rendered in the display region. $Zmax^r$ for the display region is the same as a maximum z-value for the first object 150. $Zmin^r$ for the display region is the same as a minimum z-value for the first object 150. A third object 152 is to be rendered in the display region. When $obj-zmin^r$ and $obj-zmax^r$ for the third object are compared to $zmin^r$ and $zmax^r$ of the display region, no definite answer on the visibility of the third object 152 can be given, as $obj-zmax^r$ for the third object is between $zmin^r$ and $zmax^r$. Therefore, obj-z-values at sample points 153, 154, 155 for the third object 152 are generated in each display block in the display region. By looking at the z-values at sample points 153, 154, 155 it may be determined that the z-value at sample point 155 is smaller than $zmin^r$, wherein the depth buffer need not be read for that display region. However, the value of $zmin^r$ is updated for sample point 155. Sample points 153 and 154 are determined in each display block, whereby a read of the display buffer is required before it can be determined that sample point 154 should be rendered and sample point 153 should not be rendered.

Figure 8:
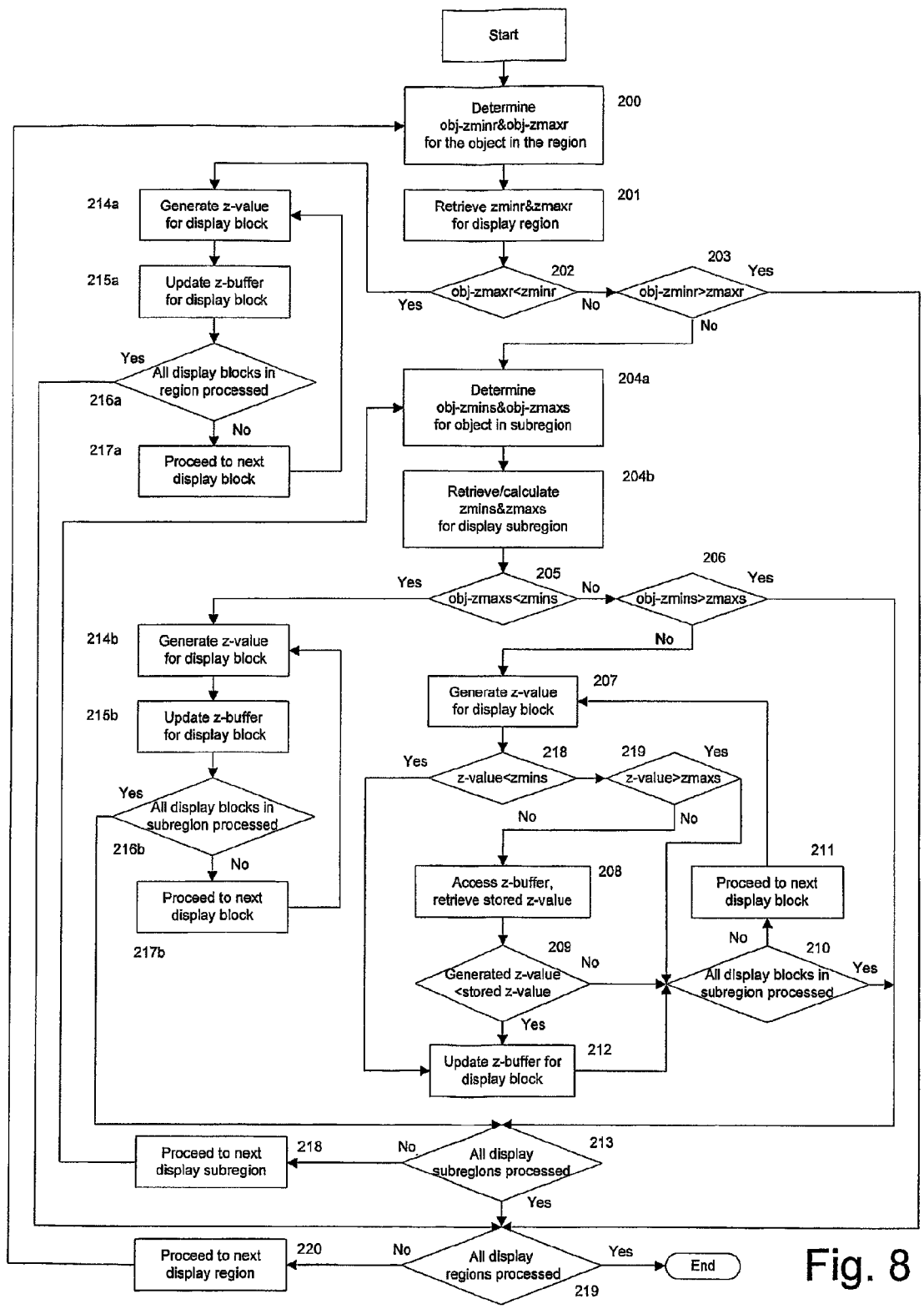
FIG. 8 is a flow-chart of one embodiment of the method according to the invention.

Turning now to FIG. 8, there is shown a flow-chart of a method wherein minimum polygon depth values and maximum polygon depth values are compared with at least one of the minimum region depth value and the maximum region depth value.

When a new object is to be rendered the following procedure is performed with reference to FIG. 8.

In block 200, $obj-zmin^r$ and $obj-zmax^r$ for the new object are estimated in a specific display region.

In block 201, $zmin^r$ and $zmax^r$ of a display region are retrieved from memory 16, 11 or 19.

In block 202, $obj-zmax^r$ is compared to $zmin^r$.

If $obj-zmax^r$ is smaller than $zmin^r$, the object is entirely positioned in front of all other content already present at the display in the region and should definitely be rendered and the procedure follows the yes-line to block 214a.

In block 214a, a z-value for the new object in a display block included in the region is generated. In block 215a, the z-buffer of the specific display block is updated with the new generated z-value. In block 216a, it is determined if all display blocks in the specific region have been processed. If no, the procedure proceeds with the next display block as indicated in block 217a and the procedure is returned to block 214a. If yes, the procedure proceeds to block 219, in which it is determined if all display regions have been processed, otherwise, the process proceeds to the next display region in block 220 and is returned to block 200 for the next region.

If in block 202, $obj-zmax^r$ is larger than $zmin^{sub}$, the procedure follows the no-line to block 203.

In block 203, $obj-zmin^r$ is compared to $zmax^r$.

If $obj-zmin^r$ is larger than $zmax^r$, the object is entirely positioned behind any other object already present on the display and should definitely not be rendered and the procedure follows the yes-line to block 219 for the next region.

If $obj-zmin^r$ is smaller than $zmax^{sub}$, no firm conclusion can be drawn as to the rendering of the object and a further investigation is required, following the no-line to block 204a.

In block 204a, $obj-zmax^{sub}$ and $obj-min^{sub}$ are determined for the object in a subregion.

In block 204b, $zmax^{sub}$ and $zmin^{sub}$ are retrieved and/or calculated for the display subregion.

In block 205, $obj-zmax^{sub}$ is compared to $zmin^{sub}$.

If $obj-zmax^{sub}$ is smaller than $zmin^{sub}$, the object is entirely positioned in front of all other objects already present at the display for the subregion and should definitely be rendered and the procedure follows the yes-line to block 214b.

In block 214b, a z-value for the new object in a display block included in the subregion is generated. In block 215b, the z-buffer of the specific display block is updated with the new generated z-value. In block 216b, it is determined if all display blocks in the specific subregion has been processed. If no, the procedure proceeds with the next display block as indicated in block 217b and the procedure is returned to block 214b. If yes, the procedure proceeds to block 213, in which it is determined if all display subregions have been processed, otherwise, the process proceeds to the next display subregion as indicated in block 218 and is returned to block 204a for the next subregion.

If in block 205, $obj-zmax^{sub}$ is larger than $zmin^{sub}$, the procedure follows the no-line to block 206.

In block 206, $obj-zmin^{sub}$ is compared to $zmax^{sub}$.

If $obj-zmin^{sub}$ is larger than $zmax^{sub}$, the object is entirely positioned behind any other content already present on the display and should definitely not be rendered and the procedure follows the yes-line to block 213 for the next subregion.

If obj-zmin$^{sub}$ is smaller than zmax$^{sub}$, no firm conclusion can be drawn as to the rendering of the object and a further investigation is required, following the no-line to block 207.

In block 207, the z-value of the new object is generated for a specific display block.

In block 218, the z-value of the object is compared to zmin$^{sub}$.

If the z-value is smaller than zmin$^{sub}$, the object is positioned in front of any content already present in the display block and should definitely be rendered and the procedure follows the yes-line to block 212.

If in block 218, the z-value is larger than zmin$^{sub}$, the procedure follows the no-line to block 219.

In block 219, the z-value is compared to zmax$^{sub}$.

If the z-value is larger than zmax$^{sub}$, the object is entirely positioned behind any content already present in the display block and should definitely not be rendered and the procedure follows the yes-line to block 210 for the next display block.

If the z-value is smaller than zmax$^{sub}$, no firm conclusion can be drawn as to the rendering of the object and a further investigation is required, following the no-line to block 208.

In block 208, the stored z-value is retrieved from the memory for the specific display block.

In block 209, the generated z-value for the object is compared with the stored and retrieved z-value.

If the generated z-value is larger than the stored z-value, the new object is behind the previous content and should not be rendered in the specific display block and the procedure follows the no-line to block 210.

In block 210, it is determined if all display blocks have been processed. If not, the procedure proceeds to the next display block as indicated in block 211, and the procedure proceeds to block 207.

If all display blocks have been processed, the procedure proceeds to block 213 for the next subregion.

If in block 209 the generated z-value is smaller than the stored z-value, the new object should be rendered in the specific display block and the procedure follows the yes-line to block 212.

In block 212, the z-buffer for that display block is updated and the procedure proceeds to block 210 for any new display block.

When all display subregions have been processed, as determined in block 213, the procedure proceeds to block 219.

In block 219, it is determined if all display regions have been processed. If yes, the procedure ends.

It is noted that the information in the color buffer may be updated at the same time as the z-buffer is updated. Alternatively, the color buffer is updated at a later time. This may be the case if several polygons are to be rendered, whereby the color buffer is updated when several or all polygons have been processed according to the invention.

According to a further embodiment, it is possible to increase the resolution of zmin$^r$ and zmax$^r$ of the display region. With smaller display regions the culling can be made more accurate. However, the on-chip storage requirements increase with decreased display regions, or if a cache is used to access zmin$^r$/zmax$^r$ then that cache will access the memory 11 more frequently. The former incurs a large cost in chip area, and the latter is counterproductive in terms of bandwidth usage. For example, moving from a display region size of 8×8 display blocks to a display region size of 4×4 display blocks will in general cost 4 times as much in terms of bandwidth usage and memory requirements.

According to one embodiment, a rather inexpensive solution to this problem is provided. Assume that a display region size of p×p display blocks is used. In order to increase performance it would be nice to use a display region size of p/2×p/2 display blocks, but increasing the on-chip memory cost by a factor of four is undesirable. Below, a p×p display region is called a display region and a p/2×p/2 display region is called a display subregion.

Figure 7:
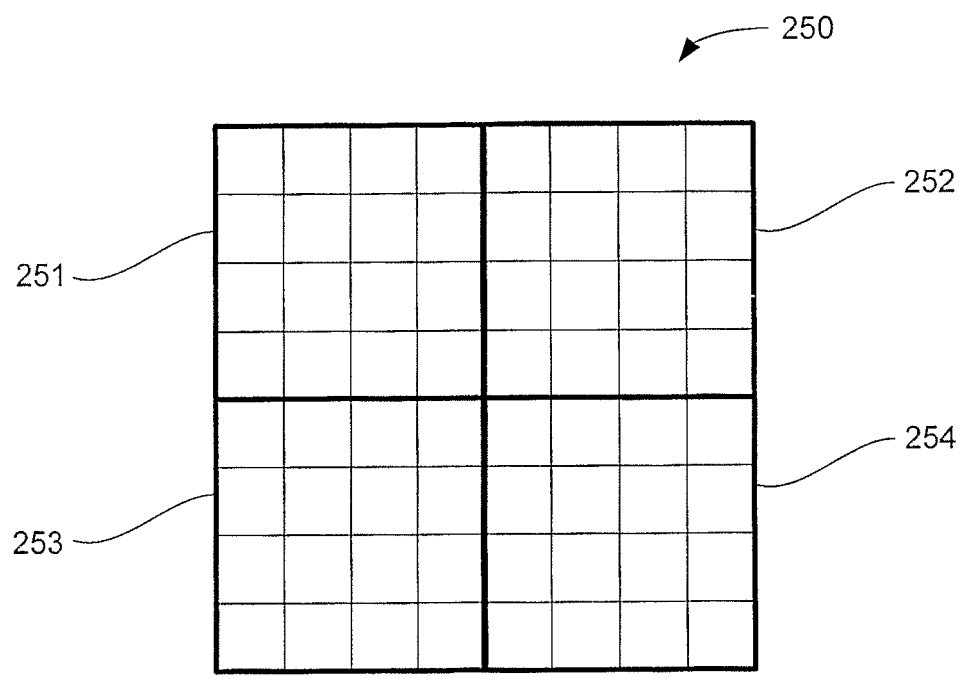
FIG. 7 is a schematic diagram of an array of a display region comprising display subregions.

FIG. 7 illustrates a display region 250 comprising four display subregions 251, 252, 253, 254. Each display subregion comprises 4×4 display blocks.

Zmin$^r$ and zmax$^r$ are stored in the storage means 19 for the entire display region 250. A minimum subregion depth value, zmin$^{sub}$ and a maximum subregion depth value, zmax$^{sub}$, for each subregion region 251, 252, 253, 254 are known to lie in the range of zmin$^r$ and zmax$^r$ for the display region. Therefore, according to one embodiment, zmin$^{sub}$ and zmax$^{sub}$ are associated with zmin$^r$ and zmax$^r$. Zmin$^{sub}$ and zmax$^{sub}$ may be determined relative to zmin$^r$ and zmax$^r$ for the display region. Zmin$^{sub}$ and zmax$^{sub}$ may be stored in the storage means 19 together with zmin$^r$ and zmax$^r$ for the display region. Thus, when a new object is to be rendered, a comparison can be made between determined zmin and zmax for the new object and at least one of zmin$^{sub}$ and zmax$^{sub}$ for each display subregion. If no general determination on visibility can be made on the first comparison, each generated z-value can be compared with zmin$^{sub}$ and/or zmax$^{sub}$. Also, the determined zmin and/or zmax for the polygon to be rendered may be compared with zmin$^r$ and/or zmax$^r$ if this is desired.

Zmin$^{sub}$ may be determined such that it is larger than or equal to zmin$^r$ and zmax$^{sub}$ may be determined such that it is smaller than or equal zmax$^r$.

Of course, zmin$^{sub}$ and zmax$^{sub}$ may be determined as the true minimum and maximum values of the depth values in the subregion.

Alternatively, zmin$^{sub}$ is determined such that it is smaller than or equal to all stored depth values for said specific subregion and zmax$^{sub}$ may be determined such that it is larger than or equal to all stored depth values for said specific subregion.

Alternatively, zmin$^{sub}$ and zmax$^{sub}$ may be determined as:

$$zmin^{sub}=zmin^r+(zmax^r-zmin^r)*k/(2^m-1), \text{ where k is in } [0, 1, 2, \ldots, 2^n-1],$$

$$zmax^{sub}=zmax^r+(zmin^r-zmax^r)*s/(2^n-1), \text{ where s is in } [0, 1, 2, \ldots, 2^n-1],$$

m being the number of bits used for encoding zmin$^{sub}$ and n being the number of bits used for encoding zmax$^{sub}$ per display subregion. m and n are integers larger or equal to one.

If m=n=2, a division by three will be performed, which comes from the fact that 2 bits were used for encoding zmin$^{sub}$ and zmax$^{sub}$; $2^2-1=3$. The division by three also entails that the possible values between and including zmin$^r$ and zmax$^r$ are evenly distributed. Zmin$^{sub}$ and zmax$^{sub}$ can take any of the possible values, including zmin$^r$ and zmax$^r$.

From a hardware perspective, the division by an odd number is undesirable as the hardware becomes more complicated. To take care of this problem, the following algorithm for determining zmin$^{sub}$ and zmax$^{sub}$ may be used instead:

$$zmin^{sub}=zmin^r+(zmax^r-zmin^r)*k/2^m, \text{ where k is in } [0, 1, 2, \ldots, 2^n-1],$$

$$zmax^{sub}=zmax^r+(zmin^r-zmax^r)*s/2^n, \text{ where s is in } [0, 1, 2, \ldots, 2^n-1],$$

In this embodiment, the value of the zmin$^{sub}$ is larger than or equal to zmin$^r$ and smaller than the zmax$^r$. The value of $zmax^{sub}$ is larger than $zmin^r$ and smaller than or equal to $zmax^r$. This means that $zmin^{sub}$ cannot store the value of $zmax^r$, and $zmax^{sub}$ cannot store the value of $zmin^r$. However, it is unlikely that this situation will occur often as one of $zmin^{sub}$ and $zmax^{sub}$ always can store $zmin^r$ or $zmax^r$. Furthermore, as long as every zmin, zmax, $zmin^{sub}$, $zmax^{sub}$, $zmin^r$ and $zmax^r$ are encoded conservatively, i.e. the nearest possible lower value for $zmin^{sub}$ and the nearest possible higher value for $zmax^{sub}$, even if another higher value is closer, the rendering will still be correct.

Other distributions of possible values for $zmin^{sub}$ and $zmax^{sub}$ between $zmin^r$ and $zmax^r$ are also possible. For example, more possible values may be provided closer to $zmin^r$ than to $zmax^r$, or vice versa, or within a certain range between $zmin^r$ and $zmax^r$. The actual distribution may be tested in each specific case.

Thus, the values of $zmax^r$ and $zmin^r$ are stored in any desired resolution with a corresponding number of bits. The values of $zmax^{sub}$ and $zmin^{sub}$ are stored as the k-number and s-number indicated in the equations above, with n bits.

Figure 6:
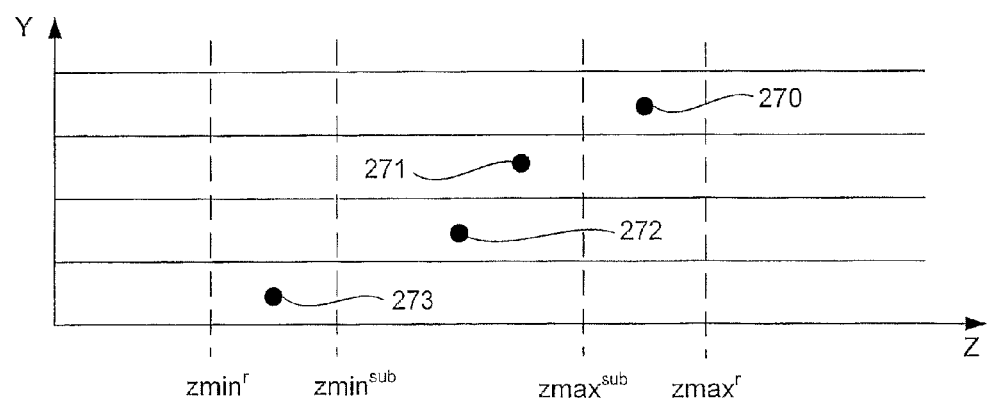
FIG. 6 is a diagram of a display region and the relationship between minimum and maximum depth values for a display region and a display subregion.

FIG. 6 illustrates a display region in cross-section, wherein display blocks are illustrated along the Y-axis and the relationship between depth values is indicated in the Z-axis. For illustrative purposes, the number of display blocks of one column of the display subregion is only four. $Zmin^r$ and $zmax^r$ for each display region, and $zmin^{sub}$ and $zmax^{sub}$ for the display subregion are indicated. Z-values 270, 271, 272, 273, are indicated which have been generated for a new object to be rendered in the display blocks of the display subregion.

By comparing either zmin/zmax, or each generated z-value 270, 271, 272, 273 for the new object, with $zmin^r$ and $zmax^r$ a definite answer on visibility will not be given, as said generated z-values are in the range defined by $zmin^r$ and $zmax^r$. Furthermore, comparing zmin/zmax for the new object will give the answer that the depth buffer 16 needs to be read, as zmin for the new object is smaller than $zmax^r$ and zmax for the new object is larger than $zmin^r$. By comparing the generated z-values 270, 271, 272, 273 with $zmin^{sub}$ and $zmax^{sub}$ it can be determined that z-value 270 is larger than $zmax^{sub}$ and definitely will be covered by content previously drawn in that display subregion when rendered, and there is no need to update the depth buffer 16 for this subregion block. Z-values 271 and 272 are larger than $zmin^{sub}$ and smaller than $zmax^{sub}$. Consequently, the depth buffer 16 has to be read to retrieve the stored z-values for the display blocks corresponding to z-value 271 and 272. Z-value 273 is smaller than $zmin^{sub}$, wherein it may be determined that no object will cover the new object in this display block when rendered, and the depth buffer 16 may be updated for this display block without being read.

As is apparent from above, using encoded $zmin^{sub}$ and $zmax^{sub}$ relative to $zmin^r$ and $zmax^r$, has the advantage that even further depth buffer read may be avoided. In the example described above, two depth buffer read out of four were avoided.

In another embodiments, a minimum polygon and/or a maximum polygon depth value for a display subregion or a polygon depth value may be compared against a combination of the minimum subregion depth value, the maximum subregion depth value, the minimum region depth value, and/or the maximum region depth value.

In still another embodiment, $zmin^{sub}$ for the display subregion is first determined relative to $zmin^r$ and $zmax^r$ of the display region. Then, $zmax^{sub}$ is encoded relative to said determined $zmin^{sub}$ for the display subregion and $zmax^r$ for the display region. Alternatively, $zmax^{sub}$ for the display subregion is first determined relative to $zmin^r$ and $zmax^r$ for the display region and then $zmin^{sub}$ for said display subregion is determined relative to $zmin^r$ for the display region and said determined $zmax^{sub}$ for the display subregion. $Zmin^{sub}$ and $zmax^{sub}$ can be generated by determining zmin and zmax of all z-values within a display subregion, and then determine $zmin^{sub}$ and $zmax^{sub}$ as described above.

Figure 9:
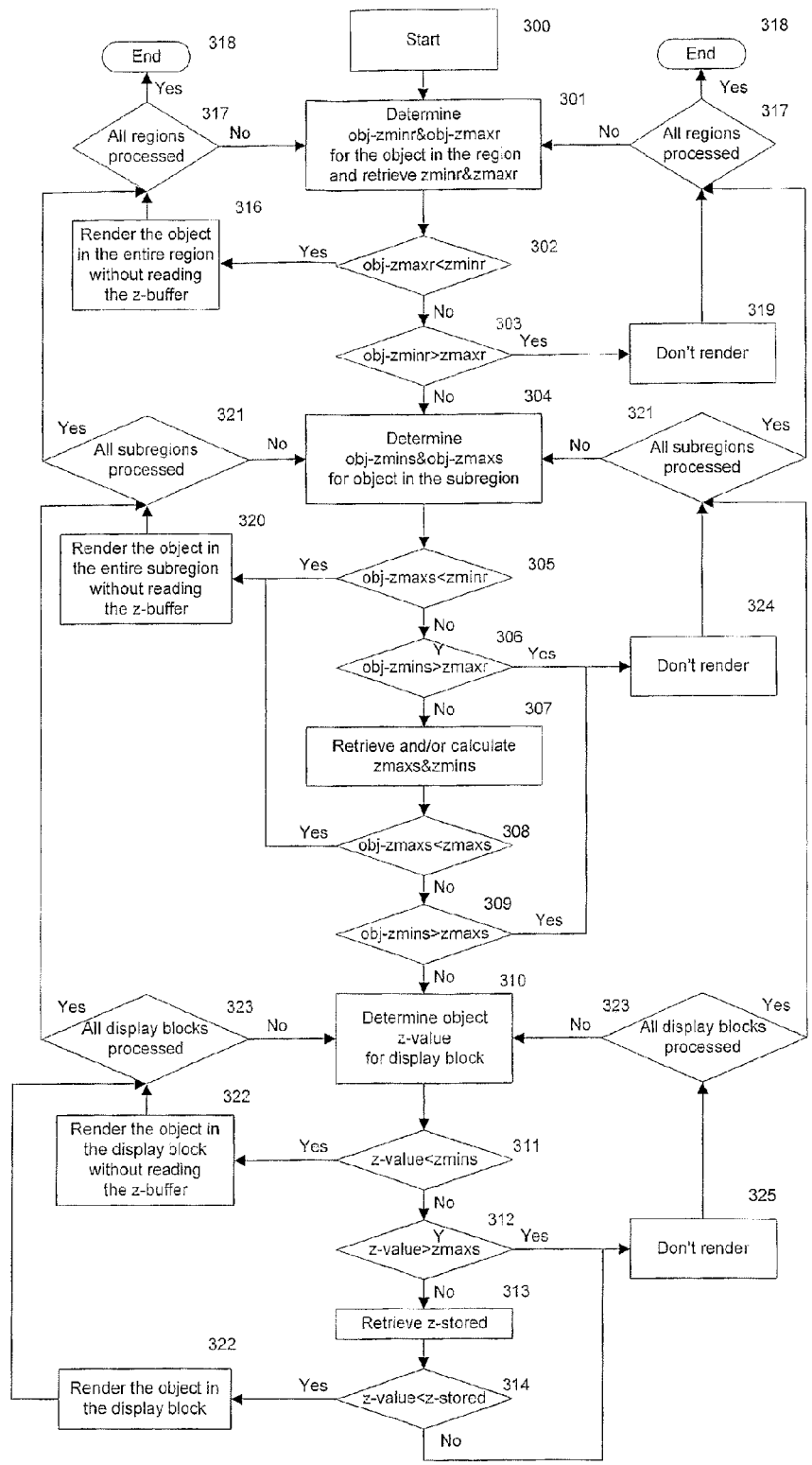
FIG. 9 is a flow-chart of an alternative embodiment of the method according to the invention.

In FIG. 9, another embodiment of the procedure is shown. The procedure starts in block 300.

In block 301, the obj-$zmin^r$ and obj-$zmax^r$ are determined. Moreover, $zmin^r$ and $zmax^r$ are retrieved from the memory.

In block 302, it is determined if obj-$zmax^r$ is smaller than $zmin^r$, in which case the new object is in front of any previous content in the display region.

If yes in block 302, the object is rendered in the entire region as shown in block 316. In block 317 it is determined if all regions are processed. If this is the case, the procedure ends in block 318, else a new display region is processed returning to block 301.

If no in block 302, the procedure proceeds to block 303, where it is determined if obj-$zmin^r$ is larger than $zmax^r$, in which case the new object is behind any previous objects in the display region.

If yes in block 303, the object should not be rendered as indicated in block 319 and the procedure proceeds to block 317 where it is determined if all regions are processed as indicated above. Block 317 is also shown on another place in FIG. 9, but that is only for making the procedure more easy to understand. The procedure is the same in each block labeled with the same reference number.

If no in block 303, no firm decision can be taken as to the rendering of the object in the region and the procedure proceeds to block 304.

In block 304, obj-$zmin^{sub}$ and obj-$zmax^{sub}$ are determined as described above.

In block 305, it is determined if obj-$zmax^{sub}$ is smaller than $zmin^r$ which already has been retrieved in block 301 and is available without any further action.

If yes in block 305, the object is rendered in the entire subregion as shown in block 320. In block 321 it is determined if all subregions are processed. If this is the case, the procedure proceeds to block 317 for the next region. Otherwise the procedure is returned to block 304 for a new subregion.

If no in block 305, the procedure proceeds to block 306, where it is determined if obj-$zmin^{sub}$ is larger than $zmax^r$, in which case the new object is behind any previous objects in the subregion. $Zmax^r$ is already available.

If yes in block 306, the object should not be rendered as indicated in block 324.

If no in block 306, the procedure proceeds to block 307, where $zmax^{sub}$ and $zmin^{sub}$ for a display subregion is retrieved and/or calculated from memory.

In block 308, it is determined if obj-$zmax^{sub}$ is smaller than $zmin^{sub}$, in which case the object is in front of any previous content in the entire subregion.

If yes in block 308, the object is rendered in the entire subregion as shown in block 320.

If no in block 308, the procedure proceeds to block 309, where it is determined if obj-$zmin^{sub}$ is larger than $zmax^{sub}$, in which case the new object is behind any previous content in the display subregion.

If yes in block 309, the object should not be rendered as indicated in block 324.

If no in block 309, no firm decision can be taken as to the rendering of the object in the subregion and the procedure proceeds to block 310.

In block 310, the z-value of the object in the display block is determined.

In block 311, it is determined if the z-value of the object is smaller than $zmin^{sub}$ which already has been retrieved in block 307 and is available without any further action.

If yes in block 311, the object is rendered in the display block as shown in block 322. In block 323 it is determined if all display blocks are processed. If this is the case, the procedure proceeds to block 321 for the next subregion. Otherwise the procedure is returned to block 310 for a new display block.

If no in block 311, the procedure proceeds to block 312, where it is determined if the z-value is larger than $zmax^{sub}$, in which case the new object is behind any previous content in the subregion. $Zmax^{sub}$ is already available.

If yes in block 312, the object should not be rendered as indicated in block 325.

If no in block 312, the procedure proceeds to block 313, where z-stored for a display block is retrieved from memory.

In block 314, it is determined-if the z-value is smaller than z-stored, in which case the object is in front of any other content in the display block.

If yes in block 314, the object is rendered in the display block as shown in block 322.

If no in block 314, the procedure proceeds to block 325.

In FIG. 9, five steps are disclosed, including blocks 302, 303; 305,306; 308,309; 311,312; and 314,315. The different steps can be performed in other combinations than what is shown in FIG. 9. For example, step 302,303, step 305,306 and step 311,312 may be optional. All three, two, one or none of these steps may be used. Moreover, it is not always necessary to use both blocks 308 and 309, while it still is an advantage to use only one of these two blocks. The same is true for all combinations of two blocks in each step.

The blocks 319, 324, 325, "don't render", involves that a read of the z-buffer and/or display subregion and region values are not required, which means a saving.

The blocks 316, 320 and 322 involves that the z-buffer is updated without first being read, which also means a saving. The procedure may be as described in relation to FIG. 8.

The display subregions may have any size, such as p×q display blocks, where p>=1 and q>=1. Also, any number of bits may be used for encoding $zmin^{sub}$ and $zmax^{sub}$. Assuming that 2×2 display blocks are used for each display subregion and that 2 bits are used for storing each relative position for each of $zmin^{sub}$ and $zmax^{sub}$, the cost is $(2*2)*(2+2)=16$ bits per display region. Furthermore, assuming that $zmin^r$ and $zmax^r$ are stored in 16 bits each, it is obvious that the scheme according to this embodiment is more effective than the prior art. For example, going from 32 bits per display region (16+16 bits for $zmin^r+zmax^r$) to a display region size of $[n/2]\times[n/2]$ would cost $32*4=128$ bits with a standard prior art scheme. The scheme according to this embodiment would cost 48 bits (16+16+16 bits for $zmin^r+zmax^r+$relative position bits).

In one embodiment, at least one of the $zmin^r$ and $zmax^r$ for the display blocks of at least one display region is determined. Either or both $zmin^r$ and $zmax^r$ is determined. Thus, also only one of $zmin^{sub}$ or $zmax^{sub}$ for the display blocks of at least one display subregion needs to be determined. However, if both $zmin^r$ and $zmax^r$ are determined both $zmin^{sub}$ and $zmax^{sub}$ are determined. This embodiment may e.g. be used if either of $zmax^{sub}$ or $zmin^{sub}$ values is not used.

$Zmin^{sub}$ may be determined relative to at least $zmin^r$. $Zmax^{sub}$ may be determined relative to at least $zmax^r$.

Imagine a display region having 4 display subregions A, B, C, D. Each subregion A, B, C, D has a minimum subregion depth value $zmin^{sub}\_A$, $zmin^{sub}\_B$, $zmin^{sub}\_C$, and $zmin^{sub}\_D$, respectively. For each display region, two minimum depth values zmin_1 and zmin_2 are determined and stored. Zmin_1 may be determined as $min[zmin^{sub}\_A, zmin^{sub}\_B, zmin^{sub}\_C, zmin^{sub}\_D]$. Thus, zmin_1 may be determined as $zmin^r$ for the display region. Zmin_2 is a value equal to or higher than zmin_1. For example, zmin_2 may be determined as $(zmin\_1+max[zmin^{sub}\_A, zmin^{sub}\_B, zmin^{sub}\_C, zmin^{sub}\_D])/2$. Another example is to take the second largest value of $[zmin^{sub}\_A, zmin^{sub}\_B, zmin^{sub}\_C, zmin^{sub}\_D]$ as the value for zmin_2. Each subregion depth value may be determined relative zmin_1, i.e. relative $zmin^r$. A bit value $zmin^{sub}\_bit$ may be used (set or cleared) for each subregion. If $zmin^{sub}$ for a specific subregion is smaller than zmin_2, the $zmin^{sub}$ bit for said specific subregion is set to a first value, such as 0. If $zmin^{sub}$ for a specific subregion is larger than or equal to zmin_2, the $zmin^{sub}$ bit for said specific subregion is set to a second value, such as 1. The first value references to zmin_1 and the second value references to zmin_2. A correct or conservative representation is in this way assured, since the encoded value will be equal to or smaller than the real value. Thus the minimum subregion depth value will be represented by either zmin_1 or zmin_2 during rendering. The values of zmin_1, zmin_2, and $zmin^{sub}\_bit$ for each subregion of the display region are stored. Zmin_1 and zmin_2 may be stored using a first number of bits, such as 16 bits for each value. The $zmin^{sub}\_bit$ values may be stored using a single bit for each value.

An example of using zmin_1 and z_min2 could be: $zmin^{sub}\_A=10$, $zmin^{sub}\_B=20$, $zmin^{sub}\_C=30$, $zmin^{sub}\_D=40$, and determining $zmin\_1=zmin^{sub}\_A=10$, and $zmin\_2=(zmin\_1+zmin\_^{sub}\_D)/2=(10+40)/2=25$. The bit values may be determined as $zmin^{sub}\_bit\_A=0$, $zmin^{sub}\_bit\_B=0$, $zmin^{sub}\_bit\_C=1$, $zmin^{sub}\_bit\_D=1$. In this example, subregion A is exactly represented, whereas subregions B, C and D are conservatively represented. If zmin_2 instead is chosen as the second largest value among $zmin^{sub}\_A$, $zmin^{sub}\_B$, $zmin^{sub}\_C$ and $zmin^{sub}\_D$, then zmin_2 becomes 30, and only B and D are conservatively represented. Storing the bit values for subregions A, B, C, and D and zmin_1 and zmin_2 as in this example requires $16+16+4*1=36$ bits. Storing minimum depth values for each subregion separately, using the same resolution as for zmin_1 and zmin_2, i.e. 16 bits, requires $4*16=64$ bits. Thus, using zmin_1 and zmin_2 and bit value representation requires considerably less storage space.

In another embodiment, zmin_1 is determined as described above, while zmin_2 is chosen as a number that is equal to or larger than zmin_1, for instance, the maximum of all the individual depth values of the display blocks (pixels) in the display region. To increase the resolution of the subregion depth values, a display region depth value interval is determined, for example the interval [zmin_1, zmin_2−1], having zmin_1 and zmin_2−1 as the end values of the interval. The interval is split into $2^N$ subintervals. N bits are used to store the bit value for each sub region. When encoding $zmin^{sub}$, the subinterval containing $zmin^{sub}$ is chosen, and the lowest value in a subinterval is used to provide conservative encoding.

An example using zmin_1 and zmin_2 and intervals could be, assuming N=3: Determine zmin_1 as $zmin^r$ and zmin_2 as the maximum of the depth values of the display blocks (pixels) in the display region. Assume zmin_1=128 and zmin_2=256. Then the display region depth value interval is determined as [128, 255] and the subintervals as [128, 143], [144, 159], [160, 175], [176, 191], [192, 207], [208, 223], [224, 240], and [241, 255]. The $zmin^{sub}\_bit$ values are determined as described above and makes reference to a certain subinterval. Assume $zmin^{sub}\_bit\_A=100b=4$. Then, $zmin^{sub}\_bit\_A$ makes reference to the fifth subinterval, i.e.

[192, 207]. To have a conservative value, the subregion depth value for sub region A will be determined as 192 during rendering. Storing the bit values and zmin_1 and zmin_2 as in this example for sub regions A, B, C, and D requires 16+16+3*4=44 bits, which still is better than storing separate depth values for each sub region, which requires 64 bits.

$zmin^{sub}$ may be determined using, for instance, the following formula: $zmin^{sub}$=zmin_1+(zmin_2−zmin_1)*k/($2^N$). k equals the $zmin^{sub}$_bit-value, and is thus in the range 0, 1, ..., $2^N$−1. In the example, N=3 and k=4, giving 4*(256−128)/$2^3$+128=192.

In an alternative embodiment, the main interval can be [zmin_1, zmin_2], and it can be divided in a different manner, so that $zmin^{sub}$ instead will be calculated the formula $zmin^{sub}$=zmin_1+(zmin_2−zmin_1)*k/($2^N$−1), where k=0, 1, ..., $2^N$−1. However, these two formulas are only examples and the starting values for the sub intervals may be calculated in alternative ways.

What has been described above with reference to zmin_1 and zmin_2 is also applicable for zmax values. Thus, zmax_1 and zmax_2 values may be determined in a corresponding manner, and thus encoding $zmax^{sub}$ in a corresponding manner. Thus, one of zmax_1 and zmax_2 will be determined at least relative $zmax^r$. Also $zmin^{sub}$ and $zmax^{sub}$ values that are stored are thus represented by the bit values. As is apparent from the above, zmin_1 may be equal to $zmax^r$. Zmin_2 may be larger than or equal to zmin_1. Similarly, zmax_2 may be equal to $zmax^r$. Zmax_ may be smaller than or equal to zmax_2.

Zmax_2 can then be calculated as max[$zmax^{sub}$_A, $zmax^{sub}$_B, $zmax^{sub}$_C, $zmax^{sub}$_D], and zmax_1 can be chosen to be a value that is equal to or smaller than zmax_2. For instance, zmax_2 may be calculated as the minimum of the depth values of the individual display elements blocks in the display region. Furthermore, the interval [zmax_1+1, zmax_2] may then be divided into $2^N$ sub intervals, and the end values of these intervals may be used as $zmax^{sub}$. For instance, $zmax^{sub}$ may be calculated using the formula $zmax^{sub}$=zmax_2+(zmin_1−zmin_2)*k/($2^N$), where k equals the $zmax^{sub}$_bit, and is thus in the range 0, 1, ..., $2^N$−1. Alternatively, the interval could be [zmax_1, zmax_2], and the endpoints could be calculated as $zmax^{sub}$=zmax_2+(zmin_1−zmin_2)*k/($2^N$−1), where k=0, 1, ..., $2^N$−1. zmax_2=$zmax^r$, zmax_2≧zmax_1. However, these two formulas are only examples and the end values for the sub intervals could be calculated in alternative ways.

Compared to traditional zmin/zmax techniques, combining the step of comparing a depth value of the polygon with the $zmin^r$ and $zmax^r$ of the display region with the step of splitting the display region into display subregions with associated coding of more accurate $zmin^{sub}$ and $zmax^{sub}$ results in significant savings in terms of depth buffer reads. The savings can give 1.6-2.9 times fewer depth buffer reads compared to traditional zmin/zmax techniques. For a game scene, this can entail that up to 40,000 unnecessary depth buffer reads are avoided per frame. Put it in another way, about 40% of the depth buffer reads are avoided. At 30 Hz (images per second), this gives 1.2 millions fewer memory accesses per second.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method for reading values from and/or writing values to a depth buffer comprising depth values for display blocks of a display,
   whereby the display is partitioned into a plurality of display regions, at least one of the display regions including a plurality of display subregions each including a plurality of said display blocks,
   the method comprising:
   determining at least one of a minimum region depth value and a maximum region depth value for the display blocks of at least one display region; and
   determining at least one of a minimum subregion depth value and a maximum subregion depth value for the display blocks of at least one display subregion, wherein
   at least one of the minimum subregion depth value and the maximum subregion depth value are determined relative to at least one of the minimum region depth value and the maximum region depth value.

2. The method according to claim 1, comprising determining the minimum subregion depth value relative to the minimum region depth value.

3. The method according to claim 1, comprising determining the maximum subregion depth value relative to the maximum region depth value.

4. The method according to claim 1, comprising determining the minimum subregion depth value relative to the minimum and maximum region depth value.

5. The method according to claim 1, comprising determining the maximum subregion depth value relative to the maximum and minimum region depth value.

6. The method according to claim 1, comprising determining the minimum subregion depth value such that it is larger than or equal to the minimum region depth value and the maximum subregion depth value such that it is smaller than or equal to the maximum region depth value.

7. The method according to claim 1, comprising determining the minimum subregion depth value such that it is smaller than or equal to all stored depth values for said subregion and the maximum subregion depth value such that it is larger than or equal to all stored depth values for said subregion.

8. The method according to claim 1, comprising determining the minimum region depth value such that it is smaller than or equal to all stored depth values for said region and the maximum region depth value such that it is larger than or equal to all stored depth values for said region.

9. The method according to claim 1, comprising:
   determining at least one of a minimum depth value and a maximum depth value of a geometric primitive to be rendered in a specific display subregion; and
   comparing at least one of the minimum depth value and the maximum depth value with at least one of the minimum subregion depth value and the maximum subregion depth value for determining whether the depth buffer needs to be read for said display subregion.

10. The method according to claim 1, comprising:
    determining at least one of a minimum depth value and a maximum depth value of a geometric primitive to be rendered in a specific display region; and
    comparing at least one of the minimum depth value and the maximum depth value with at least one of the minimum region depth value and the maximum region depth value for determining whether the depth buffer needs to be read for said display region.

11. The method according to claim 1, comprising determining at least one geometric primitive depth value for at least one display block of said subregion.

12. The method according to claim 11, comprising comparing the depth value for the geometric primitive at said at least one display block with at least one of the minimum subregion depth value and the maximum subregion depth value to determine whether the depth buffer needs to be read for said display block.

13. The method according to claim 11, comprising comparing the depth value for the geometric primitive at said at least one display block with at least one of the minimum region depth value and the maximum region depth value to determine whether the depth buffer needs to be read for said display block.

14. The method according to claim 1, comprising determining the value of the minimum subregion depth value, $zmin^{sub}$, relative to the minimum region depth value, $zmin^r$, and the maximum region depth value, $zmax^r$, according to the equation:

$$zmin^{sub}=zmin^r+(zmax^r-zmin^r)*k/(2^m-1)$$

where k is in $[0, 1, 2, \ldots, 2^m-1]$, and determining the value of the maximum subregion depth value, $zmax^{sub}$, relative to the minimum region depth value, $zmin^r$, and the maximum region depth value, $zmax^r$, according to the equation:

$$zmax^{sub}=zmax^r+(zmin^r-zmax^r)*s/(2^n-1)$$

where s is in $[0, 1, 2, \ldots, 2^n-1]$, n being the number of bits used for encoding $zmax^{sub}$ and m being the number of bits used for encoding $zmin^{sub}$ relative to the minimum region depth value and the maximum region depth value.

15. The method according to claim 1, comprising determining the value of the minimum subregion depth value, $zmin^{sub}$, relative to the minimum region depth value, $zmin^r$, and the maximum region depth value, $zmax^r$, according to the equation:

$$zmin^{sub}=zmin^r+(zmax^r-zmin^r)*k/2^m$$

where k is in $[0, 1, 2, \ldots, 2^n-1]$, and determining the value of the maximum subregion depth value, $zmax^{sub}$, relative to the minimum region depth value, $zmin^r$, and the maximum region depth value, $zmax^r$, according to the equation:

$$zmax^{sub}=zmax^r+(zmin^r-zmax^r)*s/2^n$$

where s is in $[0, 1, 2, \ldots, 2^n-1]$, wherein m is the number of bits used for encoding the minimum subregion depth value and n is the number of bits used for encoding the maximum subregion depth value relative to the minimum region depth value and the maximum region depth value.

16. The method according to claim 1, comprising:
first determining the minimum subregion depth value relative to the minimum region depth value and the maximum region depth value, and then determining the maximum subregion depth value relative to the minimum subregion depth value and the maximum region depth value, or
first determining the maximum subregion depth value relative to the minimum region depth value and the maximum region depth value, and then determining the minimum subregion depth value relative to the maximum subregion depth value and the minimum region depth value.

17. The method according to claim 1, comprising determining the value of the minimum subregion depth value, $zmin^{sub}$, relative to the minimum region depth value, $zmin^r$, according to the equation:

$$zmin^{sub}=zmin\_1+(zmin\_2-zmin\_1)*k/(2^N), \text{ or}$$

$$zmin^{sub}=zmin\_1+(zmin\_2-zmin\_1)*k/(2^N-1),$$

where $k=0, 1, \ldots, 2^N-1$, $zmin\_1=zmin^r$, $zmin\_2 \geq zmin\_1$, and N is the number of bits used to store a bit value for each display subregion.

18. The method according to claim 1, comprising determining the value of the maximum subregion depth value, $zmax^{sub}$, relative to the maximum region depth value, $zmax^r$, according to the equation:

$$zmax^{sub}=zmax\_2+(zmin\_1-zmin\_2)*k/(2^N), \text{ or}$$

$$zmax^{sub}=zmax\_2+(zmin\_1-zmin\_2)*k/(2^N-1),$$

where $k=0, 1, \ldots, 2^N-1$, $zmax\_2=zmax^r$, $zmax\_2 \geq zmax\_1$, and N is the number of bits used to store a bit value for each display subregion.

19. A processing device for reading values from or writing values to a depth buffer comprising depth values for display blocks of a display,
whereby the display is partitioned into a plurality of display regions, at least one of the display regions including a plurality of display subregions each including a plurality of said display blocks,
wherein the processing device comprises a memory including:
at least one of a minimum region depth value and a maximum region depth value for the display blocks of at least one display region; and
at least one of a minimum subregion depth value and a maximum subregion depth value for the display blocks of at least one display subregion, wherein at least one of the minimum subregion depth value and the maximum subregion depth value are determined relative to the at least one of the minimum region depth value and the maximum region depth value.

20. The processing device according to claim 19, wherein the minimum subregion depth value is related to the minimum region depth value.

21. The processing device according to claim 19, wherein the maximum subregion depth value is related to the maximum region depth value.

22. The processing device according to claim 19, wherein the minimum subregion depth value is related to the minimum and maximum region depth value.

23. The processing device according to claim 19, wherein the maximum subregion depth value is related to the maximum and minimum region depth value.

24. The processing device according to claim 19, wherein the minimum subregion depth value is larger than or equal to the minimum region depth value and the maximum subregion depth value is smaller than or equal to the maximum region depth value.

25. The processing device according to claim 19, wherein the minimum subregion depth value is smaller than or equal to all stored depth values for said subregion and the maximum subregion depth value is larger than or equal to all stored depth values for said subregion.

26. The processing device according to claim 19, comprising:
a calculation unit for determining at least one of a minimum depth value and a maximum depth value of a geometric primitive to be rendered in said specific display subregion; and
a comparator for comparing at least one of the minimum depth value and the maximum depth value with at least one of the minimum subregion depth value and the maximum subregion depth value to determine whether the depth buffer needs to be accessed for said display subregion.

27. The processing device according to claim 26, wherein the comparator is configured to compare at least one of the minimum depth value and the maximum depth value with at least one of the minimum subregion depth value and the maximum subregion depth value to determine whether the depth buffer needs to be read for said specific display subregion.

28. The processing device according to claim 26, wherein the comparator is configured to compare at least one of the minimum depth value and the maximum depth value with at least one of the minimum region depth value and the maximum region depth value to determine whether the depth buffer needs to be read for said specific display region.

29. The processing device according to claim 26, wherein the comparator is configured to determine at least one geometric primitive depth value for at least one display block in said subregion.

30. The processing device according to claim 29, wherein the comparator is configured to compare the depth value for the geometric primitive at said at least one display block with at least one of the minimum subregion depth value and the maximum subregion depth value to determine whether the depth buffer needs to be read for said display block.

31. The processing device according to claim 28, wherein the comparator is configured to compare the depth value for the geometric primitive at said at least one display block with at least one of the minimum region depth value and the maximum region depth value to determine whether the depth buffer needs to be read for said display block.

32. The processing device according to claim 19, wherein the value of the minimum subregion depth value, $zmin^{sub}$, relative to the minimum region depth value, $zmin^r$, and the maximum region depth value, $zmax^r$, are related according to the equation:

$$zmin^{sub}=zmin^r+(zmax^r-zmin^r)*k/(2^m-1)$$

where k is in $[0, 1, 2, \ldots, 2^n-1]$, and the value of the maximum subregion depth value, $zmax^{sub}$, relative to the minimum region depth value, $zmin^r$, and the maximum region depth value, $zmax^r$, are related according to the equation:

$$zmax^{sub}=zmax^r+(zmin^r-zmax^r)*s/(2^n-1)$$

where s is in $[0, 1, 2, \ldots, 2^n-1]$, n being the number of bits used to encode $zmax^{sub}$ and m being the number of bits used for encoding $zmin^{sub}$ relative to the minimum region depth value and the maximum region depth value.

33. The processing device according to claim 19, wherein the value of the minimum subregion depth value, $zmin^{sub}$, relative to the minimum region depth value, $zmin^r$, and the maximum region depth value, $zmax^r$, are related according to the equation:

$$zmin^{sub}=zmin^r+(zmax^r-zmin^r)*k/2^m$$

where k is in $[0, 1, 2, \ldots, 2^n-1]$, and the value of the maximum subregion depth value, $zmax^{sub}$, relative to the minimum region depth value, $zmin^r$, and the maximum region depth value, $zmax^r$, are related according to the equation:

$$zmax^{sub}=zmax^r+(zmin^r-zmax^r)*s/2^n$$

where s is in $[0, 1, 2, \ldots, 2^n-1]$, wherein m is the number of bits used to encode the minimum subregion depth value and n is the number of bits used for encoding the maximum subregion depth value relative to the minimum region depth value and the maximum region depth value.

34. The processing device according to claim 19, wherein the processing device is configured to:

first determine the minimum subregion depth value relative to the minimum region depth value and the maximum region depth value, and then determine the maximum subregion depth value relative to the minimum subregion depth value and the maximum region depth value, or first determine the maximum subregion depth value relative to the minimum region depth value and the maximum region depth value, and then determine the minimum subregion depth value relative to the maximum subregion depth value and the minimum region depth value.

35. The processing device according to claim 19, wherein the value of the minimum subregion depth value, $zmin^{sub}$, is related to the minimum region depth value, $zmin^r$, according to the equation:

$$zmin^{sub}=zmin\_1+(zmin\_2-zmin\_1)*k/(2^N), \text{ or}$$

$$zmin^{sub}=zmin\_1+(zmin\_2-zmin\_1)*k/(2^N-1),$$

where $k=0, 1, \ldots, 2^N-1$, $zmin\_1=zmin^r$, $zmin\_2 \geq zmin\_1$, and N is the number of bits used to store a bit value for each display subregion.

36. The processing device according to claim 19, wherein the value of the maximum subregion depth value, $zmax^{sub}$, is related relative to the maximum region depth value, $zmax^r$, according to the equation:

$$zmax^{sub}=zmax\_2+(zmin\_1-zmin\_2)*k/(2^N), \text{ or}$$

$$zmax^{sub}=zmax\_2+(zmin\_1-zmin\_2)*k/(2^N-1),$$

where $k=0, 1, \ldots, 2^N-1$, $zmax\_2=zmax^r$, $zmax\_2 \geq zmax\_1$, and N is the number of bits used to store a bit value for each display subregion.

37. An electronic apparatus comprising a processing device according to claim 19.

38. The apparatus according to claim 37, wherein the apparatus is a mobile radio terminal, a pager, a communicator, an electronic organizer, a smartphone, a personal digital assistant or a computer.

39. The apparatus according to claim 37, wherein the apparatus is a mobile telephone.

40. A computer program product comprising computer program code means embodied on a non-transitory computer readable medium to execute a method when said computer program code means is run by an electronic device having computer capabilities, wherein the method is for reading values from and/or writing values to a depth buffer comprising depth values for display blocks of a display, wherein the display is partitioned into a plurality of display regions, at least one of the display regions including a plurality of display subregions each including a plurality of said display blocks, the method comprising:

determining at least one of a minimum region depth value and a maximum region depth value for the display blocks of at least one display region; and determining at least one of a minimum subregion depth value and a maximum subregion depth value for the display blocks of at least one display subregion, wherein at least one of the minimum subregion depth value and the maximum subregion depth value are determined relative to at least one of the minimum region depth value and the maximum region depth value.

* * * * *

UNITED STATES PATENT AND TRADEMARK OFFICE
CERTIFICATE OF CORRECTION

Page 1 of 2

PATENT NO. : 8,471,851 B2
APPLICATION NO. : 11/719747
DATED : June 25, 2013
INVENTOR(S) : Ström et al.

It is certified that error appears in the above-identified patent and that said Letters Patent is hereby corrected as shown below:

On the Title Page, Item (56), under "U.S. PATENT DOCUMENTS", in Column 2, Line 1, insert
-- 6,037,946 3/2000 Takeda
6,359,623 B1 3/2002 Larson
6,313,839 B1 11/2001 Larson
6750867 B1 6/2004 Gibson --.

On the Title Page, Item (56), under "U.S. PATENT DOCUMENTS", in Column 2, insert
-- 5509110 A 4/1996 Latham --.

On the Title Page, Item (56), below "U.S. PATENT DOCUMENTS", in Column 2, at Line 5, insert
-- FOREIGN PATENT DOCUMENTS
WO 2004/057533 A2 7/2004
JP 6004682 A 1/1994 --.

On the Title Page, Item (56), in Column 2, above "* cited by examiner",
insert -- OTHER PUBLICATIONS
Japanese Office Action, dated February 25, 2011, in connection with counterpart Japanese Patent Application No. 2007-541797. --.

On the Title Page, Item (56), in Column 2, above "* cited by examiner",
insert -- PCT International Search Report, mailed March 20, 2006, in connection with International Application No. PCT/EP2005/012377.
PCT International Preliminary Report on Patentability, mailed December 22, 2006, in connection with International Application No. PCT/EP2005/01377.
Akenine-Moller, T. et al.; "Graphics for the masses: a hardware rasterization architecture for mobile phones" ACM Transactions on Graphics ACM USA, vol. 22, no. 3, July 2003, pp 801-808, XP002311930, ISSN: 0730-0301.
Morein, S.: "ATI Radeon HyperZ Technology (presentation slides)" [Online] 2000, retrieved from the Internet: URL: http://www.merl.com/hwws00/presentations/ATIHot3D.pdf> [retrieved on Signed and Sealed this
Fifteenth Day of April, 2014

Michelle K. Lee
*Deputy Director of the United States Patent and Trademark Office*

2004-12-22], XP002311931. --.

In the Specifications

In Column 2, Line 56, delete "region" and insert -- region. --, therefor.

In Column 3, Line 40, delete "$zmin^{sub}=zmin\ r+(zmax^r-zmin^r)*k/2^m$" and insert -- $zmin^{sub}=zmin^r+(zmax^r-zmin^r)*k/2^m$ --, therefor.

In Column 4, Line 37, delete "subregion." and insert -- subregion; --, therefor.

In Column 4, Line 62, delete "and," and insert -- and --, therefor.

In Column 6, Line 10, delete "shown)" and insert -- shown). --, therefor.

In Column 7, Line 4, delete "by" and insert -- be --, therefor.

In Column 7, Line 43, delete "123×96" and insert -- 128×96 --, therefor.

In Column 8, Line 34, delete "first triangle 141" and insert -- second triangle 141 --, therefor.

In Column 11, Line 39, delete "209" and insert -- 209, --, therefor.

In Column 16, Line 13, delete "$zmin^{sub}$ bit" and insert -- $zmin^{sub}\_bit$ --, therefor.

In Column 16, Line 15, delete "$zmin^{sub}$ bit" and insert -- $zmin^{sub}\_bit$ --, therefor.

In Column 17, Line 28, delete "Zmax_" and insert -- Zmax_1 --, therefor.

In the Claims

In Column 22, Line 34, in Claim 36, delete "related relative to" and insert -- related to --, therefor.